Sept. 13, 1927.  1,641,951
J. H. APPLETON ET AL
MACHINE FOR MAKING LINKS OR SIMILAR ARTICLES
Filed Feb. 21, 1924  4 Sheets-Sheet 3
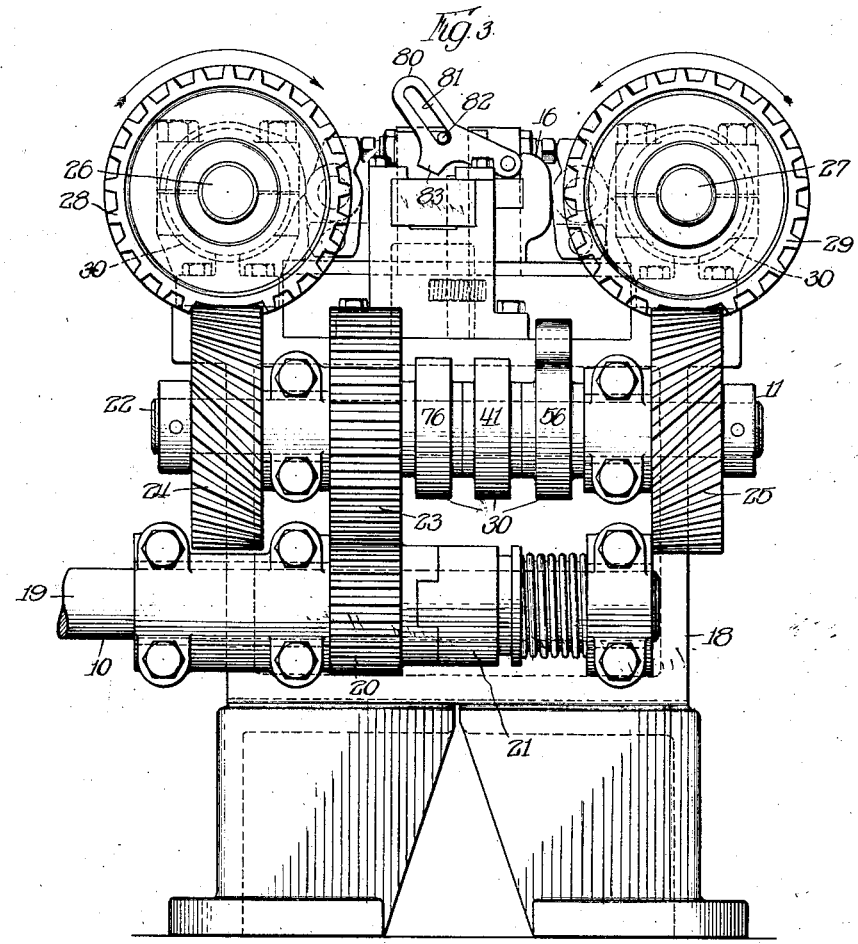
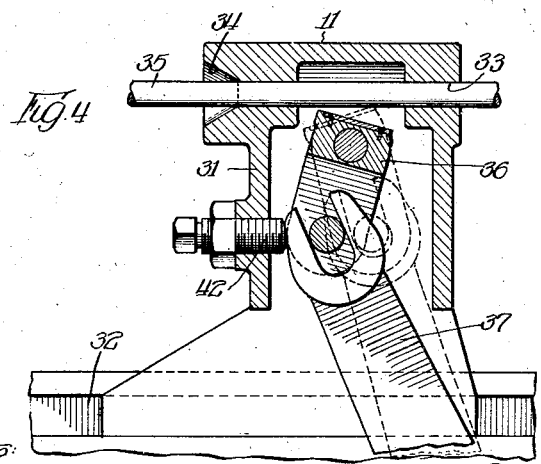
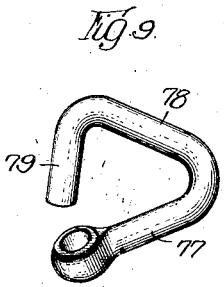
Witness:
R. Burkhardt.
Inventors:
Joseph H. Appleton,
Frank Kriz,
By Cromwell, Greist & Warden
Attys.

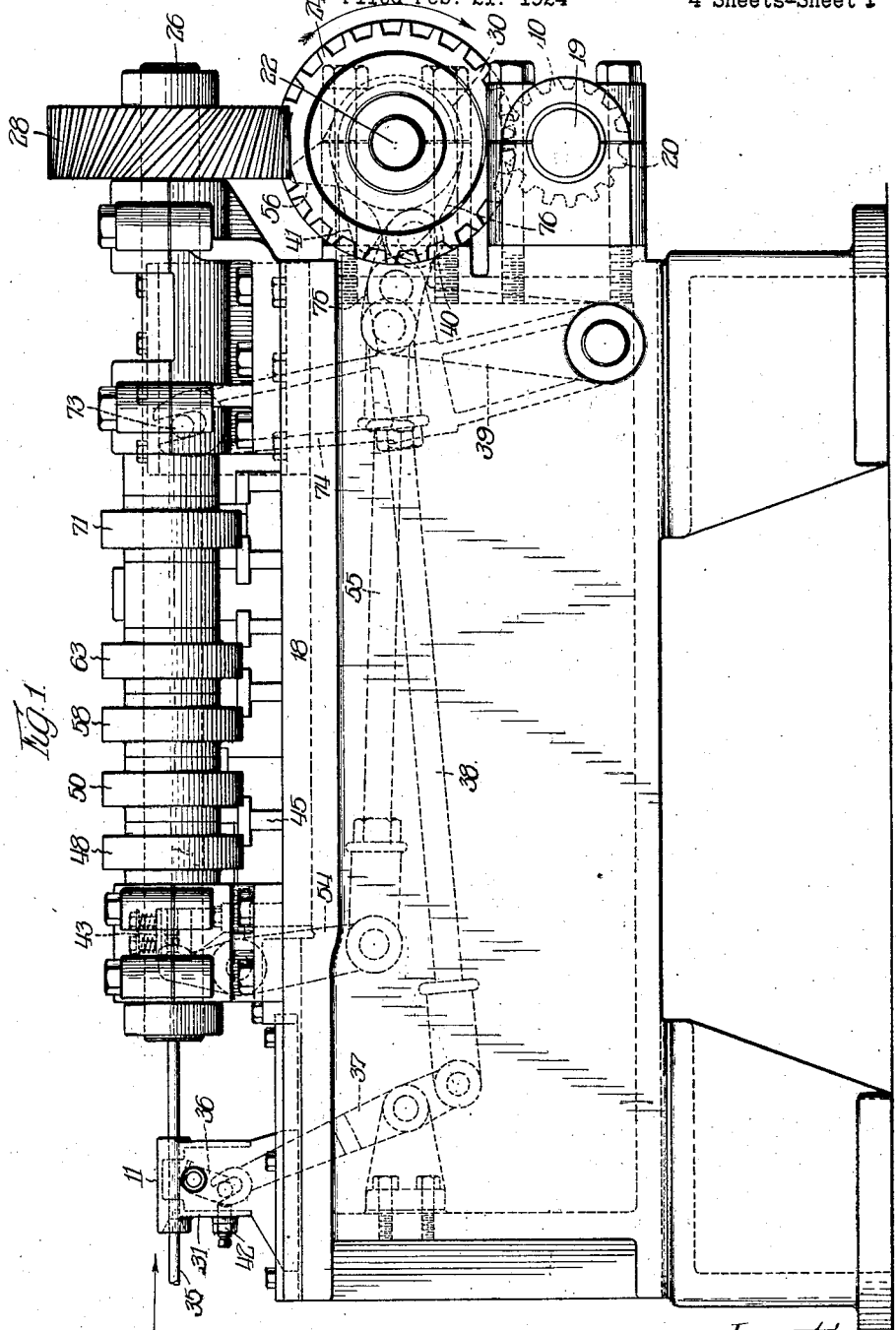

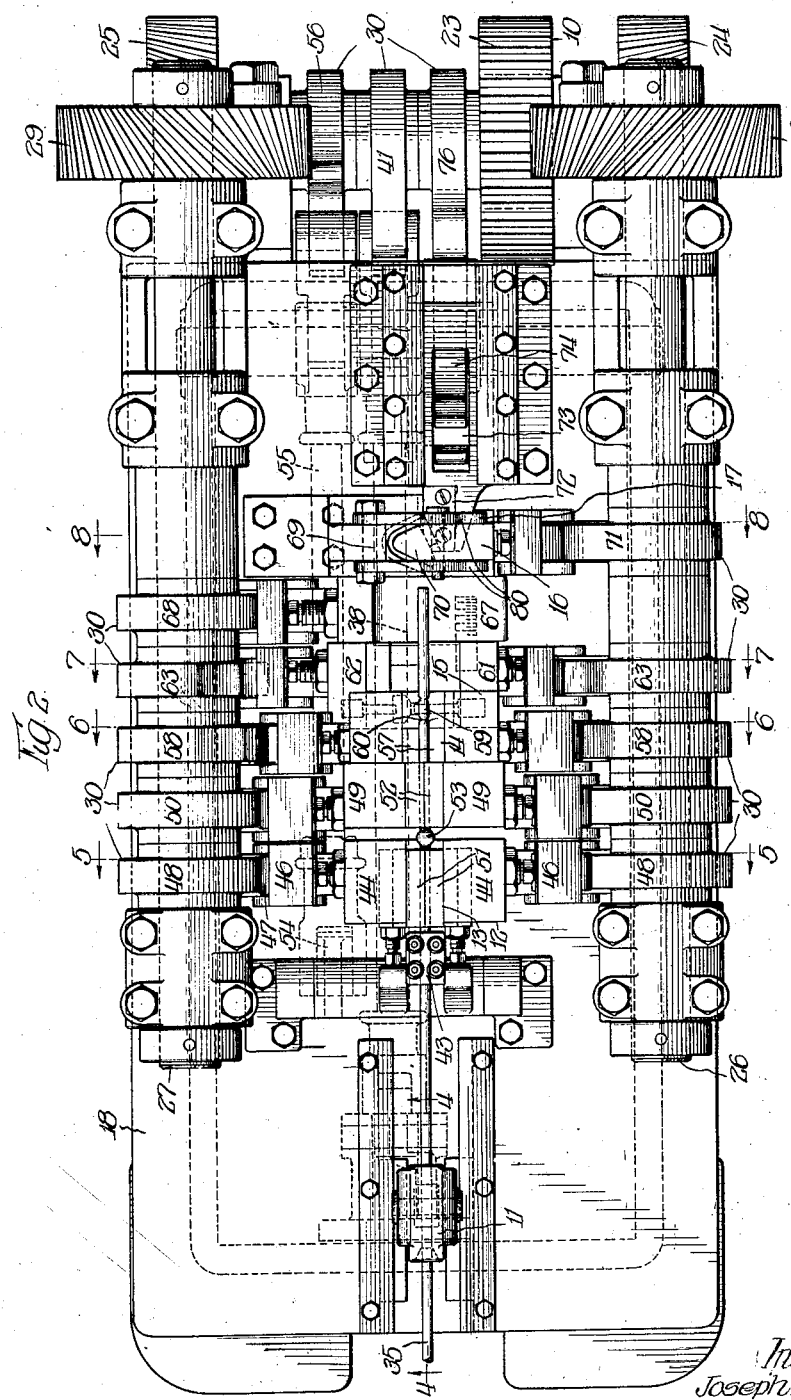

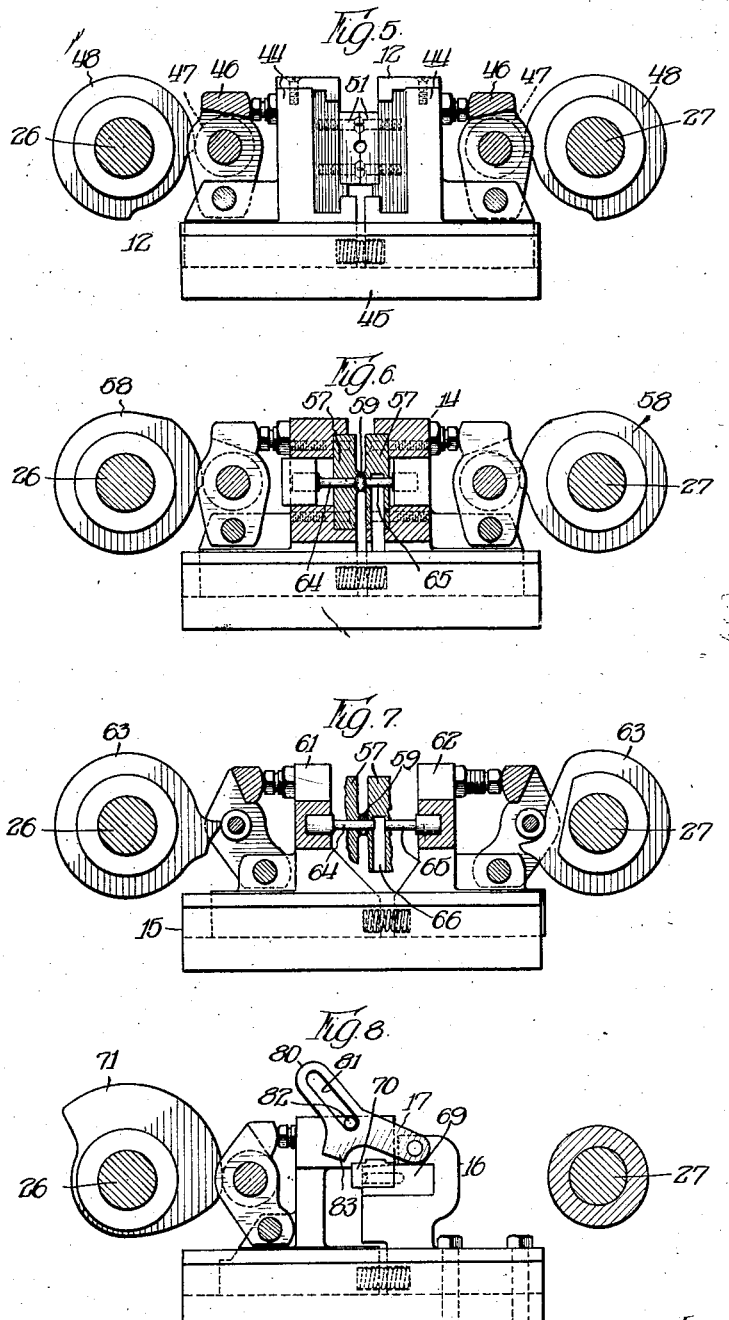

Patented Sept. 13, 1927.

1,641,951

UNITED STATES PATENT OFFICE.

JOSEPH H. APPLETON, OF PORT WASHINGTON, AND FRANK H. KRIZ, OF OSHKOSH, WISCONSIN, ASSIGNORS TO LEACH COMPANY, OF OSHKOSH, WISCONSIN, A CORPORATION OF WISCONSIN.

MACHINE FOR MAKING LINKS OR SIMILAR ARTICLES.

Application filed February 21, 1924. Serial No. 694,206.

The invention has to do with the production of cold-shut repair links, such as are commonly used to replace, without welding, unserviceable links in chains and the like.

The principle object of the invention is to provide a machine for automatically making cold-shut repair links.

Another object is to provide such a machine wherein correlated mechanisms are embodied for automatically effecting, in proper synchronism, the feeding, heating, upsetting, flattening, punching, bending and discharging operations.

Another object is to provide such a machine wherein the various operations are effected simultaneously upon a plurality of stock portions in corresponding stages of completion.

Another object is to provide such a machine wherein a substantially continuous feed of the stock for the links is had under automatic actuation of the machine, and a substantially continuous discharge of the completed links is had at a rate generally commensurate with the time interval required for but one of the various operations.

With the machine of the invention, it is possible to produce cold-shut repair links in a much more efficient manner than has heretofore been done, since the machine permits rapid, economical and uniform production. With the machine of the invention in suitably modified form, it is also possible to produce other generally similar articles in an equally efficient manner.

Other objects and advantages which are not specifically referred to in this disclosure will be appreciated by those skilled in the art upon a full comprehension of the construction, arrangement and manner of operation of the machine.

For the purpose of exemplification, one embodiment of the invention is presented in the accompanying drawings and in the following detailed description, but, as numerous other modified embodiments are obviously also within the purview of the invention, the embodiment here presented is not to be conisdered as limiting the spirit of the invention short of its intended scope as defined by the appended claims.

In the drawings—

Fig. 1 is a side view of the machine;

Fig. 2 is a top view of the same;

Fig. 3 is an end view of the same;

Fig. 4 is a section through the feeding mechanism of the same on the line 4—4 of Fig. 2;

Fig. 5 is a section through the heating and upsetting mechanisms of the same on the line 5—5 of Fig. 2;

Fig. 6 is a section through the flattening mechanism of the same on the line 6—6 of Fig. 2;

Fig. 7 is a section through the punching mechanism of the same on the line 7—7 of Fig. 2;

Fig. 8 is a section through the bending and discharging mechanisms of the same on the line 8—8 of Fig. 2, and Fig. 9 is a perspective view of one of the finished cold-shut repair links.

The machine of the invention comprises in general a power-transmitting mechanism 10, a feeding mechanism 11, a heating mechanism 12, and upsetting mechanism 13, a flattening mechanism 14, a punching mechanism 15, a bending mechanism 16 and a discharging mechanism 17. The various mechanisms mentioned are mounted in operative correlation upon an elongated table-like structure 18 which constitutes the main frame of the machine. In operation, the power-transmitting mechanism runs continuously, the other mechanisms are caused to function intermittently, the stock from which the links are to be formed is fed into the front end of the machine, and the automatically finished links are discharged from the rear end of the machine.

The power-transmitting mechanism 10—see particularly Fig. 3—includes a power shaft 19 which extends across the rear end of the frame, a gear 20 which is detachably secured to the shaft 19 by a clutch 21, a cam shaft 22 which extends across the rear end of the frame above the shaft 19, a gear 23 which is secured to the shaft 22 and is meshed with the gear 20 on the shaft 19, two gears 24 and 25 which are also secured to the shaft 22, two cam shafts 26 and 27 which extend along the sides of the frame, two gears 28 and 29 which are secured to the rear ends of the shafts 26 and 27 and are meshed respectively with the gears 24 and 25 on the shaft 22, and a number of operating cams 30 which are secured to the shafts 22, 26 and 27. The power shaft 19, operating through the clutch and the gearing provided, causes the cams 30 to rotate continuously in the directions indicated.

The feeding mechanism 11—see particularly Fig. 4—includes a hollow bracket 31 which is mounted for reciprocal movement longitudinally of the machine in a suitable guide 32 secured to the top of the frame adjacent the front end of the same. A bore 33, having an enlarged entrance 34, extends through the bracket 31 along the longitudinal axis of the machine, and receives from the operator the front end of the stock 35, which is preferably a round rod of indefinite length. A dog 36 is pivotally mounted in the bracket 31 below the bore 33 and is oscillated into or out of clutch engagement with the stock 35 by a lever 37 which is pivotally mounted on the frame with its upper end loosely coupled to the lower end of the dog 36 and its lower end coupled to the front end of a connecting rod 38. The rear end of the rod 38 is in turn coupled to another lever 39 which is pivotally mounted on the frame and supports a cam roller 40 in operative engagement with one of the cams 30 now specifically designated as 41. The roller 40 is maintained against the cam 41 by any suitable means, such as a spring or the like, and the resulting reciprocal movement of the roller 40 is transmitted by the connecting rod 38 to the upper end of the lever 37. When the upper end of the lever 37 commences its rearward movement, it will first oscillate the dog 36 into clutched engagement with the stock 35 and will then move the dog 36, the stock 35 and the bracket 31 rearwardly as a unit, thereby advancing the stock 35 into the other mechanisms of the machine a distance equal to the length of stock needed for one link, and, when the upper end of the lever 37 commences its forward movement, it will first oscillate the dog 36 out of clutched engagement with the stock 35 and will then move the dog 36 and the bracket 31 forwardly without the stock 35, thereby returning the feeding mechanism to its original position for fresh engagement with the stock. An adjustable stop 42 which is mounted in the bracket 31 serves as a thrust abutment against which the upper end of the lever bears during the latter part of its forward movement, and a two-part clamping device 43 which is arranged on the frame rearwardly of the feeding mechanism serves to embrace the stock 35 in constant spring-pressed engagement, whereby to counteract any tendency of the stock to return to its original position during the forward movement of the dog 36 and the bracket 31.

The heating mechanism 12—see particularly Figs. 2 and 5—includes two coacting front electrodes 44 44 which are mounted for reciprocal movement towards and away from each other transversely of the machine in a suitable guide 45 on the frame, two brackets 46 46 which are adjustably positioned on the electrodes and support cam rollers 47 47 in operative engagement with two of the cams 30 now specifically designated as 48 48, and two coacting rear electrodes 49 49 which are mounted a short distance rearwardly of the front electrodes for reciprocal movement like the front electrodes and are provided, like the front electrodes, with brackets and cam rollers in operative engagement with two of the cams 30 now specifically designated at 50 50. The portions 51 51 and 52 52 of the front and rear electrodes which engage with the stock 35 constitutes spaced insulated terminals in an electric circuit, and, when clamped rigidly against longitudinally-spaced portions of the stock 35 by the actuation of the cams 48 48 and 50 50, cause the intervening portion 53 of the stock to be heated quickly to a high temperature by the passage of current through the same. Any suitable means, such as springs or the like, may be employed to move the electrodes away from each other again upon completion of the heating operation.

The upsetting mechanism 13—see particularly Figs. 1, 2 and 5—is associated structurally with the front electrodes 44 44 of the heating mechanism, and includes the portions 51 51 which are slidably mounted in the remaining portions of the front electrodes for reciprocal movement longitudinally of the machine independently of their heretofore described movement transversely of the machine. A lever 54 is pivotally mounted on the frame with its upper end connected to transmit movement to the portions 51 51, and with its lower end coupled to the front end of a connecting rod 55. The rear end of the rod 55 is in turn coupled, like the rear end of the connecting rod 38, to another lever which is pivotally mounted on the frame and supports a cam roller in operative engagement with one of the cams 30 now specifically designated as 56. The lever 54 serves to move the portions 51 51 of the front electrodes rearwardly a short distance toward the rear electrodes while the front and rear electrodes are still tightly clamped against the spaced portions of the stock 35 at the completion of the heating operation, whereby to upset axially the heated and therefore readily malleable portion 53 of the stock. Any suitable means, such as springs or the like, may be employed to return the portions 51 51 to their original position in the front electrodes upon completion of the upsetting operation.

The flattening mechanism 14—see particularly Figs. 2 and 6—includes two coacting die members 57 57 which are mounted, like the electrodes of the heating mechanism, for reciprocal movement towards and away from each other transversely of the machine and are provided, like the electrodes, with brackets and cam rollers in operative engagement with two of the cams 30 now specifically designated as 58 58. The portions of the die members 57 57 which operate on the upset portion 53 of the stock 35 are shallow circular recesses having cutting projections along their front edges. When the die members are brought together on the stock under the actuation of the cams 58 58, the upset portion 53 is flattened into a disk 59, and the disk, with a length of stock extending from the same toward the rear of the machine, is partially severed at 60 from the stock extending from the disk toward the front of the machine.

The punching mechanism 15—see particularly Figs. 2, 6 and 7—includes two coacting die members 61 62 which are mounted for reciprocal movement in unison transversely of the machine and are provided, like the electrodes of the heating mechanism and the die members of the flattening mechanism, with brackets and cam rollers in operative engagement with two of the cams 30 now specifically designated as 63. The portions of the die members 61 62 which operate on the flattened disk 59 of the stock 35 are respectively a cylindrical punch 64 and a cylindrical punch plug 65, which portions of the die members 61 and 62 are disposed in longitudinally lapping and freely movable relation to the die members 57 57 and move in conforming bores opening centrally into the shallow circular recesses of the die members 57 57. The punch 64 moves toward the disk 59 of the stock while the disk is still held between the die members 57 57 upon the completion of the flattening operation, and punches an aperture in the center of the disk. During such movement of the punch 64, the punch plug 65 recedes from the opposite face of the disk and permits the slug cut from the disk to drop through an opening 66 in one of the die members 57 57. The punch 64 is then positively withdrawn from the aperture in the disk by a member 67 which is linked to the die member carrying the punch 64 by means of a laterally extending pin 67ª and is provided, like either one of the die members 61 62, with a bracket and a cam roller in operative engagement with one of the cams 30 now specifically designated as 68. The pin 67ª is in lapped relation to a portion of the die member 61 carrying the punch 67, and, when the pin is reciprocated in one direction, it interlocks with that portion of the die member 61 and moves the die member to cause the punch 64 to return to its normal position.

The bending mechanism 16—see particularly Figs. 2, 3 and 8—includes a stationary anvil member 69, a primary bending die member 70 which is mounted opposite the anvil member 69 for reciprocal movement transversely of the machine and is provided, like either one of the die members 61, 62, with a bracket and a cam roller in operative engagement with one of the cams 30 now specifically designated as 71, and a secondary bending die member 72 which is mounted rearwardly of the anvil member 69 and the die member 70 for reciprocal movement longitudinally of the machine and is provided with a cross pin 73 and a pivotally mounted lever 74 which is coupled at its upper end with the cross pin 73 and supports a cam roller 75 in operative engagement with one of the cams 30 now specifically designated as 76. Any suitable means, such as springs or the like, may be employed to move the die members 70 and 72 away from the anvil member 69 again upon the completion of the primary and secondary phases of the bending operation. The face of the anvil member 69 is medially recessed and provided with an angulated groove having the bent configuration of the sides 77 and 78 of the finished link illustrated in Fig. 9; the head of the primary bending die member 70 is medially extended and provides an angulated groove complementary to the groove of the anvil member; and the head of the secondary die member 72 is beveled complementary with a side face of the head of the die member 70 and provides, in association with the grooves in the faces of the members 70 and 72, a groove having the bent configuration of the side 79 of the finished link. The primary bending die member 70 first moves toward the stationary anvil member 69 and bends therebetween the stock 35, which was, prior to such bending operation, shaped as an apertured head at one end of a short length of round stock, and, as the stock 35 is thus bent to form the sides 77 and 78 of the finished link, the slight connection of the apertured head with the stock in the machine forwardly thereof is sheared. The secondary bending die member 72 then moves towards the beveled side of the head of the bending die member 70 and bends therebetween the stock 35 to form the side 79 of the finished link, leaving the now finished link in an encompassing position about the front and side faces of the head of the die member 70.

The discharging mechanism—see particularly Figs. 2, 3 and 8—is associated structurally with the bending die member 70 and the anvil member 69 of the bending mechanism, and includes two spaced links 80 which are pivotally mounted at corresponding ends to the upper portion of the stationary anvil member 69 of the bending mechanism and are provided adjacent their free ends with inclined slots 81 which engage over studs 82 on the upper portion of the primary bending die member 70. The links 80 have downwardly extending projections 83 located above the position assumed by the finished link on the faces of the head of the die member 70, and, when the die member 70 is withdrawn away from the anvil member 69 upon the completion of the primary and secondary phases of the bending operation, the projections swing outwardly and strip the finished link from the head of the die member, whereupon the finished link will drop into any suitable receptacle or chute provided to receive the same.

The operation of the machine of the invention may be briefly summarized as follows:

At the commencement of the automatic operation, the operator in charge of the machine inserts into the bore of the feeding mechanism one end portion of a long piece of the stock from which the links are to be formed, and positions such entering end portion against the friction gauge presented by the front face of the two-part clamping device. During the first operating cycle of the machine, the entering end portion of the stock is advanced by the feeding mechanism only into the front electrodes of the heating mechanism, and no portion of the stock is positioned in operative relation to the heating, upsetting, flattening, punching, bending, or discharging mechanisms. During the second cycle, the entering end portion is advanced into the rear electrodes, and the heating and upsetting operations are then had on the end portion. During the third cycle, the end portion is advanced into the die members 57 57, and the flattening and punching operations are then had on the end portion while the heating and upsetting operations are being had on that portion of the stock next to the end portion. During the fourth cycle, the end portion is advanced into the bending die members 70 72 and the bending and discharging operations are then had on the end portion to finish the first link while the flattening and punching operations are being had on the portion of the stock next to the end portion and while the heating and upsetting operations are being had on the portion of the stock second to the end portion. It is evident that during each operating cycle after the third cycle, all of the mechanisms are active upon various portions of the stock in corresponding stages of completion, and a substantially continuous discharge of the finished links is had.

While the machine of the invention is herein presented as one wherein the various correlated operating mechanisms are disposed in longitudinally aligned arrangement, it is evident that other modified arrangements of the mechanisms might be employed. For instance, the mechanisms might be arranged in a circle, or the order in which the mechanisms function might be changed, or certain of the mechanisms might be modified as where the stock is cut to length before insertion into the machine and accordingly necessitates a different feeding mechanism, or certain of the mechanisms might be omitted as where the stock is fed to the machine in an already heated condition, or certain of the mechanisms might be duplicated as where the stock is brought up to the desired heat in stages calling for different sets of heating electrodes. All such structural modifications are obviously within the purview of the invention.

We claim:

1. In a machine for making links or similar articles, means for feeding in stock for one article, means for forming an aperture in one end of the stock, and means for bending the other end of the stock into approximate registration with the apertured end.

2. In a machine for making links or similar articles, means for feeding in stock for one article, means for upsetting one portion of the stock, means for flattening the upset portion, means for punching the flattened portion, means for bending the stock into the desired form, and means for discharging the finished article.

3. In a machine for making links or similar articles, means for feeding in stock for one article, means for heating the fed-in portion of the stock, means for upsetting the heated portion, means for flattening the upset portion, means for punching the flattened portion, means for bending the stock into the desired form, and means for discharging the finished article.

4. In a machine for making links or similar articles, an elongated frame, a number of tools arranged lengthwise of the frame in pairs, two shafts extending lengthwise of the frame at opposite sides of the same, connections between the shafts and the tools for operating the latter in each pair toward and away from each other to perform different forming operations on the stock, and means for feeding the stock lengthwise of the frame into operative relation to the tools whereby a series of operations are effected simultaneously on a number of lengths of stock in corresponding stages of completion.

5. In a machine for making links or similar articles, an elongated frame, a number of tools arranged lengthwise of the frame in pairs, two continuously rotating cam shafts extending lengthwise of the frame at opposite sides of the same, cams in operative relation to the cam shafts, connections between the cams and the tools for operating the latter in each pair toward and away from each other intermittently to perform different forming operations on the stock, and means for feeding the stock intermittently lengthwise of the machine into operative relation to the tools whereby a series of operations are effected simultaneously on a number of lengths of stock in corresponding stages of completion.

6. In a machine for making links or similar articles, a discharging mechanism comprising a stationary anvil member, a die member, movable toward and away from the anvil member and having a head about which the finished link is left by the previous coaction of the members, and a stripping member having a pivotal connection with one of the members and a cam connection with the other, whereby when the members are separated the stripping member will be moved by said separation to strip the finished link from the head of the die member.

7. In a machine for making links or similar articles, a discharging mechanism comprising a stationary anvil member, a die member movable toward and away from the anvil member and having a head about which the finished link is left by the previous coaction of the members, and a stripping member having a pivotal connection with one of the members and a pin-and-slot connection with the other, whereby when the members are separated the stripping member will be moved by said separation to strip the finished link from the head of the die member.

In testimony whereof we have hereunto signed our names.

JOSEPH H. APPLETON.
FRANK H. KRIZ.